(12) United States Patent
Schreiber et al.

(10) Patent No.: US 11,594,779 B2
(45) Date of Patent: Feb. 28, 2023

(54) BATTERY PACK FOR ELECTRIC VERTICAL TAKE-OFF AND LANDING AIRCRAFT

(71) Applicant: BETA AIR, LLC, South Burlington, VT (US)

(72) Inventors: Stuart Denson Schreiber, Essex, VT (US); Nathan William Joseph Wiegman, Essex Junction, VT (US); Tom Michael Hughes, Bristol, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/348,960

(22) Filed: Jun. 16, 2021

(65) Prior Publication Data

US 2022/0407159 A1    Dec. 22, 2022

(51) Int. Cl.
*H01M 10/00* (2006.01)
*H01M 50/211* (2021.01)
*H01M 50/528* (2021.01)
*H01M 50/534* (2021.01)
*H01M 10/42* (2006.01)
(Continued)

(52) U.S. Cl.
CPC ........... *H01M 50/211* (2021.01); *B60L 50/60* (2019.02); *B60L 58/10* (2019.02); *B64D 27/24* (2013.01); *H01M 10/4257* (2013.01); *H01M 10/482* (2013.01); *H01M 50/249* (2021.01); *H01M 50/325* (2021.01); *H01M 50/528* (2021.01); *H01M 50/534* (2021.01); *B60L 2200/10* (2013.01); *H01M 2010/4278* (2013.01); *H01M 2220/20* (2013.01); *H02J 7/0047* (2013.01)

(58) Field of Classification Search
CPC ............. H01M 50/211; H01M 50/534; H01M 10/482; H01M 50/249; H01M 50/528; H01M 50/325; H01M 10/4257; H01M 2010/4278; H01M 2220/20; B60L 50/60; B60L 58/10; B60L 2200/10; B64D 27/24; H02J 7/0047
See application file for complete search history.

(56) References Cited

U.S. PATENT DOCUMENTS 8,168,317 B2 *   5/2012   Yoon ................... H01M 50/502
                                                    429/153
8,541,126 B2     9/2013   Hermann et al.
(Continued)

FOREIGN PATENT DOCUMENTS

WO    2020232663    11/2020

OTHER PUBLICATIONS

By: Dr. Mark Crittenden, How lithium-sulfur is meeting the challenges of eVTOL, Sep. 28, 2020.

*Primary Examiner* — Nicholas P D'Aniello
(74) *Attorney, Agent, or Firm* — Caldwell Intellectual Property Law

(57) ABSTRACT

Certain aspects relate to a battery pack for electric vertical take-off and landing aircraft. Exemplary battery pack includes a first pouch cell, a second pouch cell, at least a sensor, where the at least a sensor is configured to sense battery pack data and transmit the battery pack data to a data storage system, and a vent configured to vent the ejecta from the first pouch cell. In some embodiments, battery pack may be configured to power at least a propulsor component.

20 Claims, 7 Drawing Sheets

(51) Int. Cl.
*H01M 50/325* (2021.01)
*H01M 10/48* (2006.01)
*B64D 27/24* (2006.01)
*B60L 50/60* (2019.01)
*B60L 58/10* (2019.01)
*H01M 50/249* (2021.01)
*H02J 7/00* (2006.01)

(56) References Cited

U.S. PATENT DOCUMENTS

| | | | |
|---|---|---|---|
| 10,153,636 | B1 | 12/2018 | Vander Lind et al. |
| 10,497,996 | B1 | 12/2019 | Muniz et al. |
| 10,784,538 | B2 | 9/2020 | Chang et al. |
| 2011/0223448 | A1* | 9/2011 | Kim .................. H01M 50/342 |
| | | | 429/53 |
| 2016/0036024 | A1* | 2/2016 | Choi .................. H01M 50/325 |
| | | | 429/54 |
| 2017/0331323 | A1* | 11/2017 | Ehrmantraut ............ H02K 7/14 |
| 2018/0048036 | A1* | 2/2018 | Melack ............. H01M 10/6551 |
| 2019/0339334 | A1 | 11/2019 | Mikolajczak |
| 2020/0052253 | A1 | 2/2020 | Urem |
| 2020/0106140 | A1* | 4/2020 | Monismith ......... H01M 50/147 |
| 2021/0104793 | A1 | 4/2021 | Parkanzky et al. |

* cited by examiner

BATTERY PACK FOR ELECTRIC VERTICAL TAKE-OFF AND LANDING AIRCRAFT

FIELD OF THE INVENTION

The present invention generally relates to the field of transportation and aircraft. In particular, the present invention is directed to a battery pack for electric vertical take-off and landing vehicle.

BACKGROUND

Manned electric vertical take-off and landing (eVTOL) aircraft flight folds the promise of uncongested commuted roadways and air-travel without the presently concomitant fossil fuel usage. eVTOL aircraft flight requires electric energy storage, for example by way of battery bells. Battery cells can suffer from thermal runaway. Thermal runaway occurs when a battery cell overheats causing conditions that contribute to further overheating of the battery cell in an uncontrolled positive feedback loop. Conflagration resulting from thermal runaway of a single battery cell is further fueled when thermal runaway progresses to second or third battery cell.

SUMMARY OF THE DISCLOSURE

In an aspect a battery pack for an electric vertical take-off and landing aircraft includes a first pouch cell, a second pouch cell, at least a sensor, where the at least a sensor is configured to sense battery pack data and transmit the battery pack data to a data storage system, and a vent configured to vent the ejecta from the first pouch cell. In some embodiments, battery pack may be configured to power at least a propulsor component. In some embodiments, first pouch cell may include at least a first pair of electrodes, at least a first pair of foil tabs welded to the first electrodes, at least a first insulator layer located substantially between the at least a first pair of foil tabs, a first pouch substantially encompassing the at least a first pair of foil tabs and the at least a first insulator layer, and a first electrolyte within the first pouch. And, in some embodiments, a second pouch cell may include at least a second pair of electrodes, at least a second pair of foil tabs welded to the second electrodes, at least a second insulator layer located substantially between the at least a second pair of foil tabs, a second pouch substantially encompassing the at least a second pair of foil tabs and the at least a second insulator layer; and a second electrolyte within the second pouch.

In another aspect a method of manufacture for an electric vertical take-off and landing aircraft includes receiving a first pouch cell, receiving a second pouch cell, installing at least a sensor, where the at least a sensor is configured to sense battery pack data and transmit the battery pack data to a data storage system, configuring a vent to vent the ejecta from the first pouch cell, and configuring the battery pack to power at least a propulsor component. In some embodiments, first pouch cell may include at least a first pair of electrodes, at least a first pair of foil tabs welded to the first electrodes, at least a first insulator layer located substantially between the at least a first pair of foil tabs, a first pouch substantially encompassing the at least a first pair of foil tabs and the at least a first insulator layer, and a first electrolyte within the first pouch. And, in some embodiments, a second pouch cell may include at least a second pair of electrodes, at least a second pair of foil tabs welded to the second electrodes, at least a second insulator layer located substantially between the at least a second pair of foil tabs, a second pouch substantially encompassing the at least a second pair of foil tabs and the at least a second insulator layer; and a second electrolyte within the second pouch.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a battery pack for preventing progression of thermal runaway between modules. In an embodiment, an electric vertical take-off and landing vehicle (eVTOL) may include a battery pack for preventing progression of thermal runaway between modules. Some embodiments include methods of manufacture for a battery pack for preventing progression of thermal runaway between modules.

Aspects of the present disclosure can be used to contain ejecta resulting from thermal runaway of a first battery cell, thereby preventing said ejecta from contributing to thermal runaway of a second battery cell. Aspects of the present disclosure can also be used to contain ejecta resulting from heating (e.g., non-thermal runaway conditions) of a first battery cell. This is so, at least in part, because materials vented from a battery cell prior to thermal runaway may cool and condense on neighboring battery cells; this condensate may then ignite when in presence of increased temperature and/or oxidizer, for example when a nearby battery cell experience thermal runaway.

Aspects of the present disclosure allow for vented materials from a battery cell to be isolated away from other battery cells as they are being vented. This may prevent ejecta, electrolyte vapors, off-gas, and the like from a first battery cell from influencing thermal conditions of a second battery cell. Further aspects of the present disclosure may also be used with one or more pouch or prismatic battery cells. In some cases, pouch battery cells may allow for packaging efficiencies in excess of 90% or even 95% compared to other (e.g., can) battery cell packaging systems. Additionally, in some cases, pouch battery cells may be configured to reduce weight of a battery pack. In order to realize the potential offered by electric vertical take-off and landing (eVTOL) aircraft batteries must be available that are space and weight efficient and above all safe and reliable. In some embodiments, battery packs according to the present disclosure may be configured for use in eVTOL aircraft and may help to one day fully realize the potential of eVTOL flight. Exemplary embodiments illustrating aspects of the present disclosure are described below in the context of several specific examples.

Figure 1:
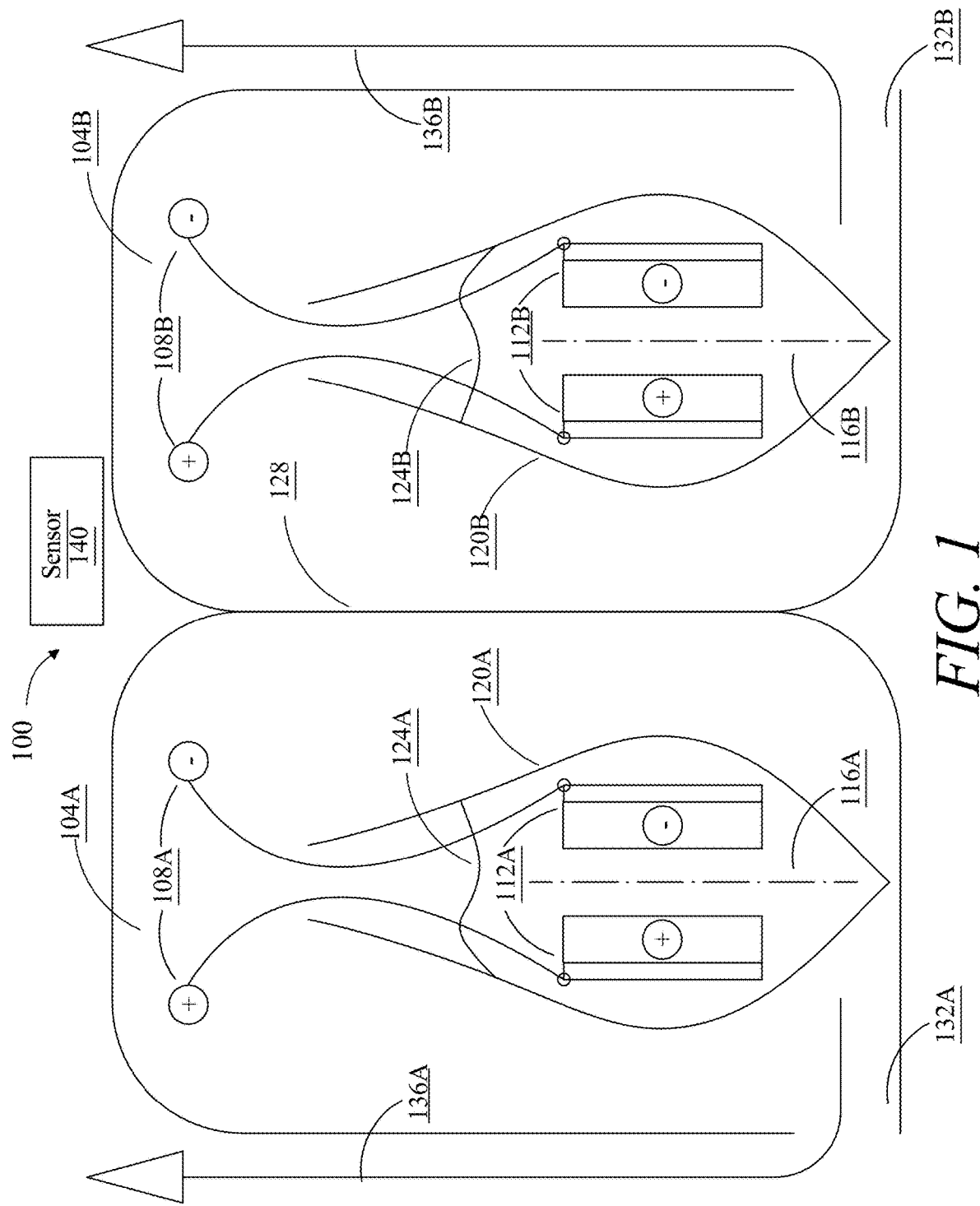
FIG. 1 is a block diagram of an exemplary battery pack for preventing progression of thermal runaway between modules.

Referring now to the drawings, FIG. 1 illustrates a block diagram of an exemplary battery pack 100 for preventing progression of thermal runaway between modules. Battery pack 100 may include a pouch cell 104A-B. As used in this disclosure, "pouch cell" is a battery cell or module that includes a pouch. In some cases, a pouch cell may include or be referred to as a prismatic pouch cell, for example when an overall shape of pouch is prismatic. In some cases, a pouch cell may include a pouch which is substantially flexible. Alternatively or additionally, in some cases, pouch may be substantially rigid. Pouch cell 104A-B may include at least a pair of electrodes 108A-B. At least a pair of electrodes 108A-B may include a positive electrode and a negative electrode. Each electrode of at least a pair of electrodes 108A-B may include an electrically conductive element. Non-limiting exemplary electrically conductive elements include braided wire, solid wire, metallic foil, circuitry, such as printed circuit boards, and the like. At least a pair of electrodes 108A-B may be in electric communication with and/or electrically connected to at least a pair of foil tabs 112A-B. At least a pair of electrodes 108A-B may be bonded in electric communication with and/or electrically connected to at least a pair of foil tabs 112A-B by any known method, including without limitation welding, brazing, soldering, adhering, engineering fits, electrical connectors, and the like. In some cases, at least a pair of foil tabs may include a cathode and an anode. In some cases, an exemplary cathode may include a lithium-based substance, such as lithium-metal oxide, bonded to an aluminum foil tab. In some cases, an exemplary anode may include a carbon-based substance, such as graphite, bonded to a copper tab. A pouch cell 104A-B may include an insulator layer 116A-B. As used in this disclosure, an "insulator layer" is an electrically insulating material that is substantially permeable to battery ions, such as without limitation lithium ions. In some cases, insulator layer may be referred to as a separator layer or simply separator. In some cases, insulator layer 116A-B is configured to prevent electrical communication directly between at least a pair of foil tabs 112A-B (e.g., cathode and anode). In some cases, insulator layer 116A-B may be configured to allow for a flow ions across it. Insulator layer 116A-B may consist of a polymer, such as without limitation polyolifine (PO). Insulator layer 116A-B may comprise pours which are configured to allow for passage of ions, for example lithium ions. In some cases, pours of a PO insulator layer 116A-B may have a width no greater than 100 μm, 10 μm, or 0.1 μm. In some cases, a PO insulator layer 116A-B may have a thickness within a range of 1-100 μm, or 10-50 μm.

With continued reference to FIG. 1, pouch cell 104A-B may include a pouch 120A-B. Pouch 120A-B may be configured to substantially encompass at least a pair of foil tabs 112A-B and at least a portion of insulator layer 116A-B. In some cases, pouch 120A-B may include a polymer, such as without limitation polyethylene, acrylic, polyester, and the like. In some case, pouch 120A-B may be coated with one or more coatings. For example, in some cases, pouch may have an outer surface coated with a metalizing coating, such as an aluminum or nickel containing coating. In some cases, pouch coating be configured to electrically ground and/or isolate pouch, increase pouches impermeability, increase pouches resistance to high temperatures, increases pouches thermal resistance (insulation), and the like. An electrolyte 124A-B is located within pouch. In some cases, electrolyte 124A-B may comprise a liquid, a solid, a gel, a paste, and/or a polymer. Electrolyte may wet or contact one or both of at least a pair of foil tabs 112A-B.

With continued reference to FIG. 1, battery pack 100 may additionally include an ejecta barrier 128. Ejecta barrier may be located substantially between a first pouch cell 104A and a second pouch cell 104B. As used in this disclosure, an "ejecta barrier" is any material or structure that is configured to substantially block, contain, or otherwise prevent passage of ejecta. As used in this disclosure, "ejecta" is any material that has been ejected, for example from a battery cell. In some cases, ejecta may be ejected during thermal runaway of a battery cell. Alternatively or additionally, in some cases, eject may be ejected without thermal runaway of a battery cell. In some cases, ejecta may include lithium-based compounds. Alternatively or additionally, ejecta may include carbon-based compounds, such as without limitation carbonate esters. Ejecta may include matter in any phase or form, including solid, liquid, gas, vapor, and the like. In some cases, ejecta may undergo a phase change, for example ejecta may be vaporous as it is initially being ejected and then cool and condense into a solid or liquid after ejection. In some cases, ejecta barrier may be configured to prevent materials ejected from a first pouch cell 104A from coming into contact with a second pouch cell 104B. For example, in some instances ejecta barrier 128 is substantially impermeable to ejecta from battery pouch cell 104A-B. In some embodiments, ejecta barrier 128 may include titanium. In some embodiments, ejecta barrier 128 may include carbon fiber. In some cases, ejecta barrier 128 may include at least a one of a lithiophilic or a lithiophobic material or layer, configured to absorb and/or repel lithium-based compounds. In some cases, ejecta barrier 128 may comprise a lithiophilic metal coating, such as silver or gold. In some cases, ejecta barrier 128 may be flexible and/or rigid. In some cases, ejecta barrier 128 may include a sheet, a film, a foil, or the like. For example in some cases, ejecta barrier may be between 25 and 5,000 micrometers thick. In some cases, an ejecta barrier may have a nominal thickness of about 2 mm. Alternatively or additionally, in some cases, an ejecta barrier may include rigid and/or structural elements, for instance which are solid. Rigid ejecta barriers 128 may include metals, composites and the like. In some cases, ejecta barrier 128 may be further configured to structurally support at least a pouch cell 128. For example in some cases, at least a pouch cell 128 may be mounted to a rigid ejecta barrier 128.

With continued reference to FIG. 1, battery pack 100 may additionally include at least a vent 132A-B. In some cases, at least a vent 132A may be configured to vent ejecta from first pouch cell 104A. In some cases, at least a vent 104A may be configured to vent ejecta along a flow path 136A. A flow path 136A may substantially exclude second pouch cell 104B, for example fluids such as gases liquids, or any material that acts as a gas or liquid, flowing along the flow path 136A may be cordoned away from contact with second pouch cell 104B. For example flow path 136A may be configured to not intersect with any surface of second pouch cell 104B. Flow path 136A-B may include any channel, tube, hose, conduit, or the like suitable for facilitating fluidic communication, for example with a pouch cell 104A-B. In some cases, flow path 136A-B may include a check valve. As used in this disclosure, a "check valve" is a valve that permits flow of a fluid only in certain, for example one, direction. In some cases check valve may be configured to allow flow of fluids substantially only away from battery pouch cell 104A-B, while preventing back flow of vented fluid to the battery pouch cell 104A-B. In some cases, check valve may include a duckbill check valve. In some cases, a duckbill check valve may have lips which are substantially in a shape of a duckbill. Lips may be configured to open to allow forward flow (out of the lips), while remaining normally closed to prevent backflow (into the lips). In some cases, duckbill lips may be configured to automatically close (remain normally closed), for example with use of a compliant element, such as without limitation an elastomeric material, a spring, and the like. In some embodiments vent may include a mushroom poppet valve. In some cases, a mushroom poppet valve may include a mushroom shaped poppet. Mushroom shaped poppet may seal against a sealing element, for example a ring about an underside of a cap of the mushroom shaped poppet. In some cases, mushroom poppet valve may be loaded against sealing element, for example by way of a compliant element, such as a spring. According to some embodiments, vent 132A-B may have a vacuum applied to aid in venting of ejecta. Vacuum pressure differential may range from 0.1" Hg to 36" Hg.

With continued reference to FIG. 1, battery pack 100 may include a first battery pouch cell 104A and a second battery pouch cell 104B. First pouch cell 104A may include at least a first pair of electrodes 108A, at least a first pair of foil tabs 112A in electrical communication with the first electrodes 108A, at least a first insulator layer 116A located substantially between the at least a first pair of foil tabs 112A, a first pouch 120A substantially encompassing the at least a first pair of foil tabs 112A and at least a portion of the at least a first separator layer 116A, and a first electrolyte 124A within the first pouch 120A. Second pouch cell 104B may include at least a second pair of electrodes 108B, at least a second pair of foil tabs 112B in electrical communication with the first electrodes 108B, at least a second insulator 116B located substantially between the at least a first pair of foil tabs 112B, a second pouch 120B substantially encompassing the at least a second pair of foil tabs 112B and at least a portion of the at least a second insulator 116B, and a second electrolyte 124B within the second pouch 120B. Battery pack 100 may include an ejecta barrier 128 located substantially between first pouch cell 104A and second pouch cell 104B. Ejecta barrier 128 may be substantially impermeable to ejecta, for example ejecta from first pouch cell 104A. In some cases, battery pack 100 may include a vent configured to vent ejecta, for example from first pouch cell 104A. In some embodiments, ejecta barrier 128 may substantially encapsulates at least a portion of pouch cell 104A-B. For example, ejecta barrier 128 may substantially encapsulate first pouch cell 104A. In some cases, vent may be configured to provide fluidic communication through at least one of ejecta barrier 128 and pouch 120A-B. In some cases, vent may include a seam. Seam may be a seam of pouch 120A-B. Alternatively or additionally; seam may be a seam of ejecta barrier 128.

With continued reference to FIG. 1, in some embodiments battery pack 100 may additionally include a third pouch cell. Third pouch cell may include at least a third pair of electrodes, at least a third pair of foil tabs welded to the third electrodes, at least a third insulator layer located substantially between the at least a third pair of foil tabs, a third pouch substantially encompassing the at least a third pair of foil tabs and the at least a third separator layer, and a third electrolyte within the third pouch. Battery pack may include a plurality including any number of pouch cells. In some cases, each pouch cell of plurality of pouch cells is separated from adjacent pouch cells with at least an ejecta barrier 128. Any pouch cell of plurality of pouch cells in battery pack may include any component described in this disclosure, for example without limitation vents, valves, and the like.

Still referring to FIG. 1, in some embodiments, pouch cells 104A-B may include Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. Batteries and/or battery modules may include without limitation batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Pouch cells 104A-B may include lead-based batteries such as without limitation lead acid batteries and lead carbon batteries. Pouch cells 104A-B may include lithium sulfur batteries, magnesium ion batteries, and/or sodium ion batteries. Batteries may include solid state batteries or supercapacitors or another suitable energy source. Batteries may be primary or secondary or a combination of both. Additional disclosure related to batteries and battery modules may be found in co-owned U.S. Patent Applications entitled "SYSTEM AND METHOD FOR HIGH ENERGY DENSITY BATTERY MODULE" and "SYSTEMS AND METHODS FOR RESTRICTING POWER TO A LOAD TO PREVENT ENGAGING CIRCUIT PROTECTION DEVICE FOR AN AIRCRAFT," having U.S. patent application Ser. Nos. 16/948,140 and 16/590,496 respectively; the entirety of both applications are incorporated herein by reference. Persons skilled in the art, upon reviewing the entirety of this disclosure, will be aware of various devices of components that may be used as a battery module. In some cases, battery pack 100 is constructed in a manner that vents ejecta, while preventing ejecta from one pouch cell from interacting with another pouch cell.

With continued reference to FIG. 1, battery pack 100 may include at least a sensor 140. At least a sensor 140 may include a sensor suite, for example as described with reference to FIGS. 4-5 below. In some cases, at least a sensor 140 may be configured to sense battery pack data and transmit battery pack data to a data storage system, for example as described below in reference to FIGS. 4-5.

Figure 2:
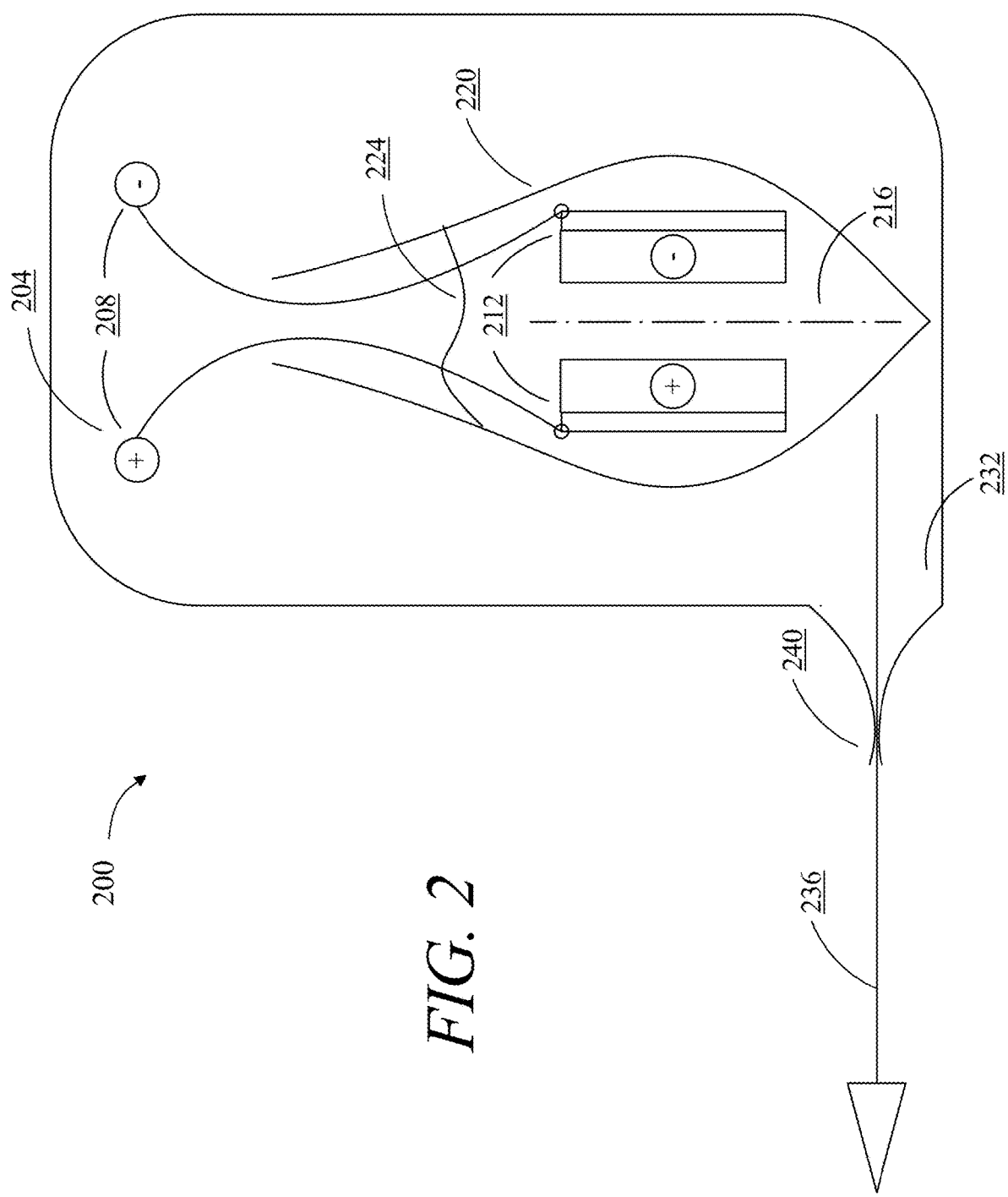
FIG. 2 is a block diagram of another exemplary battery pack for preventing progression of thermal runaway between modules.

Referring now to FIG. 2, at least a portion of an exemplary battery pack 200 is illustrated. As shown in FIG. 2, battery pack 200 may include a pouch cell 204. Pouch cell 204 may include at least a pair of electrodes 208, at least a pair of foil tabs 212 in electrical communication with the electrodes 208, at least an insulator layer 216 located substantially between the at least a pair of foil tabs 212, a pouch 120 substantially encompassing the at least a pair of foil tabs 212 and at least a portion of the at least a separator layer 216, and a first electrolyte 224 within the pouch 220. Battery pack 200 may include an ejecta barrier 228. Ejecta barrier 228 may configured to prevent ejecta from one pouch cell 204 from reaching another pouch cell. In some cases, ejecta may include hot matter, which if left uncontained could transfer heat to other, e.g., neighboring, pouch cells. By preventing hot ejecta from reaching pouch cells ejecta barrier 228 may aid in preventing progression of thermal runaway between battery cells within battery pack 200. In some cases, ejecta may include combustible materials, which if left uncontained could settle upon other, e.g., neighboring, pouch cells. Combustible materials once combustion conditions are met may combust generating an exothermic reaction, which can induce thermal runaway on nearby battery cells. Combustion conditions can include presence of oxygen, fuel, spark, flash point, fire point, and/or autoignition temperature. Battery pack 200 may include a vent 232. Vent 232 may provide for ejecta flow along a flow path 236. Vent may include a check valve 240. Check valve 240 may be configured to allow for a flow fluids in substantially one direction, for example away from pouch cell 204. In some cases, vent 232 may be configured to allow for a venting of ejecta from pouch cell 204 without substantially any flow of ejecta toward the pouch cell 204, for example from other battery cells. According to some embodiments, battery pack 200 may be incorporated in an aircraft, for example a vertical take-off and landing aircraft.

Figure 3:
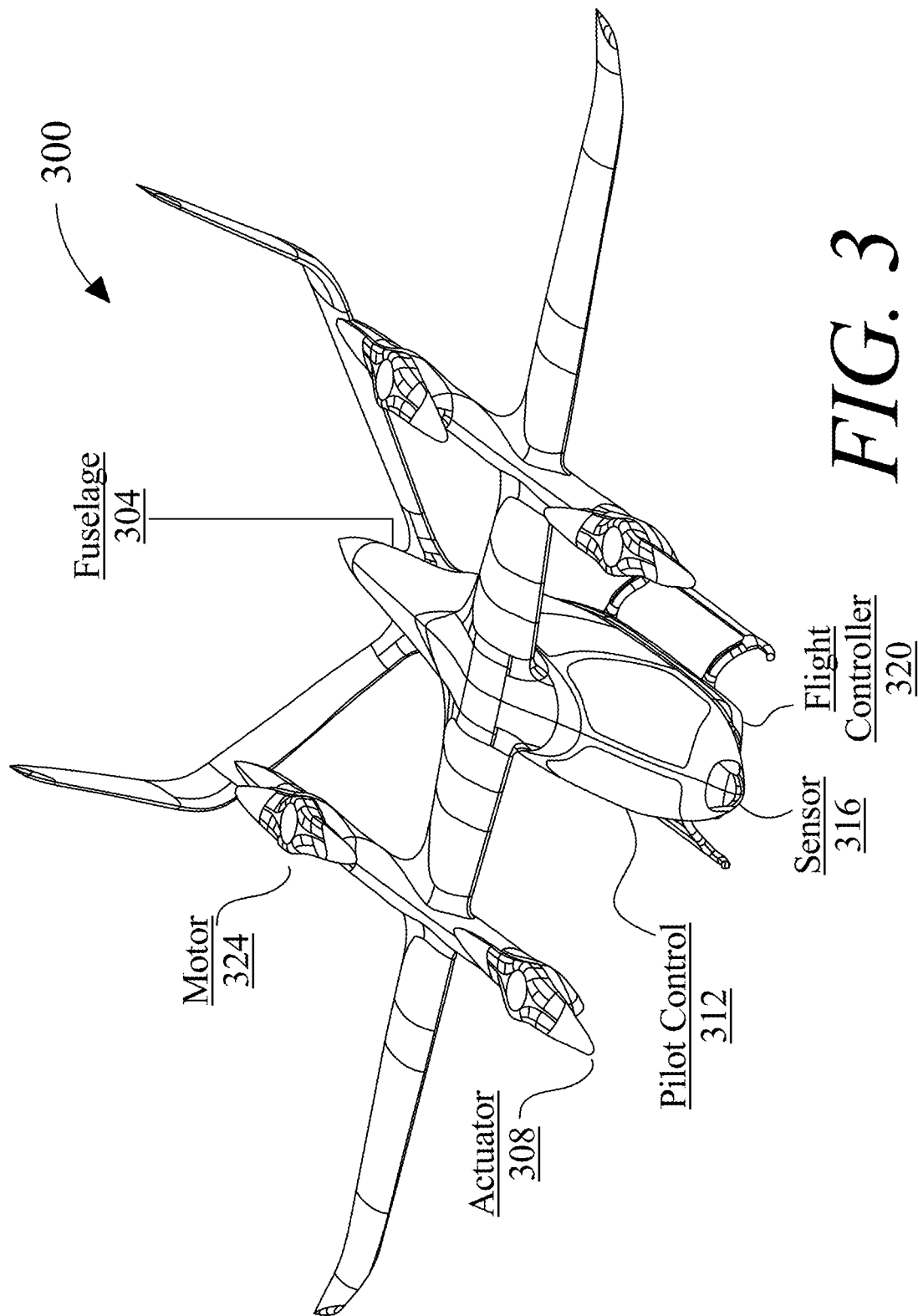
FIG. 3 is a schematic representation of an exemplary electric vertical take-off and landing vehicle.

Referring now to FIG. 3, an exemplary embodiment of an aircraft 300 is illustrated. Aircraft 300 may include an electrically powered aircraft. In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 3, aircraft 300 may include a fuselage 304. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 304 may comprise structural elements that physically support the shape and structure of an aircraft. Structural elements may take a plurality of forms, alone or in combination with other types. Structural elements may vary depending on the construction type of aircraft and specifically, the fuselage. Fuselage 304 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 3, aircraft 300 may include a plurality of actuators 308. In an embodiment, actuator 108 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 3, a plurality of actuators 108 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 108 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 108 may include a rudder, which may include, without limitation, a segmented rudder that produces a torque about a vertical axis. Additionally or alternatively, plurality of actuators 108 may include other flight control surfaces such as propulsors, rotating flight controls, or any other structural features which can adjust movement of aircraft 300. Plurality of actuators 108 may include one or more rotors, turbines, ducted fans, paddle wheels, and/or other components configured to propel a vehicle through a fluid medium including, but not limited to air.

Still referring to FIG. 3, plurality of actuators 108 may include at least a propulsor component. As used in this disclosure a "propulsor component" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 3, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 3, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 3, plurality of actuators 308 may include power sources, control links to one or more elements, fuses, and/or mechanical couplings used to drive and/or control any other flight component. Plurality of actuators 308 may include a motor that operates to move one or more flight control components and/or one or more control surfaces, to drive one or more propulsors, or the like. A motor may be driven by a motor drive, such as without limitation a direct current (DC) electric power and may include, without limitation, brushless DC electric motors, switched reluctance motors, induction motors, or any combination thereof. Alternatively or additionally, a motor drive may include an inverter. A motor drive may also include electronic speed controllers, inverters, or other components for regulating motor speed, rotation direction, and/or dynamic braking.

Still referring to FIG. 3, plurality of actuators 308 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Energy source may include a battery pack, for example as described in reference to FIGS. 1-2. Configuration of an energy source containing connected modules may be designed to meet an energy or power requirement and may be designed to fit within a designated footprint in an electric aircraft in which system may be incorporated.

In an embodiment, and still referring to FIG. 3, an energy source may be used to provide a steady supply of electrical power to a load over a flight by an electric aircraft 300. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 3, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

Still referring to FIG. 3, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 3, another exemplary actuator may include landing gear. Landing gear may be used for take-off and/or landing/Landing gear may be used to contact ground while aircraft 300 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 3, aircraft 300 may include a pilot control 312, including without limitation, a hover control, a thrust control, an inceptor stick, a cyclic, and/or a collective control. As used in this disclosure a "collective control" is a mechanical control of an aircraft that allows a pilot to adjust and/or control the pitch angle of the plurality of actuators 308. For example and without limitation, collective control may alter and/or adjust the pitch angle of all of the main rotor blades collectively. For example, and without limitation pilot control 312 may include a yoke control. As used in this disclosure a "yoke control" is a mechanical control of an aircraft to control the pitch and/or roll. For example and without limitation, yoke control may alter and/or adjust the roll angle of aircraft 300 as a function of controlling and/or maneuvering ailerons. In an embodiment, pilot control 312 may include one or more foot-brakes, control sticks, pedals, throttle levels, and the like thereof. In another embodiment, and without limitation, pilot control 312 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 300 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 300 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 3, pilot control 312 may be configured to modify a variable pitch angle. For example, and without limitation, pilot control 312 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control 312 may modify the variable pitch angle from a first angle of 2.71° to a second angle of 3.82°. Additionally or alternatively, pilot control 312 may be configured to translate a pilot desired torque for flight component 108. For example, and without limitation, pilot control 312 may translate that a pilot's desired torque for a propeller be 160 lb. ft. of torque. As a further non-limiting example, pilot control 312 may introduce a pilot's desired torque for a propulsor to be 290 lb. ft. of torque. Additional disclosure related to pilot control 312 may be found in U.S. patent application Ser. Nos. 17/001,845 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 3, aircraft 300 may include a loading system. A loading system may include a system configured to load an aircraft of either cargo or personnel. For instance, some exemplary loading systems may include a swing nose, which is configured to swing the nose of aircraft 100 of the way thereby allowing direct access to a cargo bay located behind the nose. A notable exemplary swing nose aircraft is Boeing 747. Additional disclosure related to loading systems can be found in U.S. patent application Ser. No. 17/137,594 entitled "SYSTEM AND METHOD FOR LOADING AND SECURING PAYLOAD IN AN AIRCRAFT" by R. Griffin et al., entirety of which in incorporated herein by reference.

Still referring to FIG. 3, aircraft 300 may include a sensor 316. Sensor 316 may be configured to sense a characteristic of pilot control 312. Sensor may be a device, module, and/or subsystem, utilizing any hardware, software, and/or any combination thereof to sense a characteristic and/or changes thereof, in an instant environment, for instance without limitation a pilot control 312, which the sensor is proximal to or otherwise in a sensed communication with, and transmit information associated with the characteristic, for instance without limitation digitized data. Sensor 316 may be mechanically and/or communicatively coupled to aircraft 300, including, for instance, to at least a pilot control 312. Sensor 316 may be configured to sense a characteristic associated with at least a pilot control 312. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 316 may include at least a geospatial sensor. Sensor 316 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 100 for both critical and non-critical functions. Sensor may be incorporated into vehicle or aircraft or be remote.

Still referring to FIG. 3, in some embodiments, sensor 316 may be configured to sense a characteristic associated with any pilot control described in this disclosure. Non-limiting examples of a sensor 316 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 316 may sense a characteristic as an analog measurement, for instance, yielding a continuously variable electrical potential indicative of the sensed characteristic. In these cases, sensor 316 may additionally comprise an analog to digital converter (ADC) as well as any additionally circuitry, such as without limitation a Whetstone bridge, an amplifier, a filter, and the like. For instance, in some cases, sensor 316 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 300, for instance without limitation a computing system, a pilot display, and a memory component. Alternatively or additionally, sensor 316 may sense a characteristic of a pilot control 312 digitally. For instance in some embodiments, sensor 316 may sense a characteristic through a digital means or digitize a sensed signal natively. In some cases, for example, sensor 316 may include a rotational encoder and be configured to sense a rotational position of a pilot control; in this case, the rotational encoder digitally may sense rotational "clicks" by any known method, such as without limitation magnetically, optically, and the like.

Still referring to FIG. 3, electric aircraft 300 may include at least a motor 324, which may be mounted on a structural feature of the aircraft. Design of motor 324 may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor 324 may include two main holes in top and bottom of mounting area to access bearing cartridge. Further, a structural feature may include a component of electric aircraft 300. For example, and without limitation structural feature may be any portion of a vehicle incorporating motor 324, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 308. Persons skilled in the art, upon reviewing the entirety of this disclosure, will be aware of various materials, combinations of materials, and/or constructions techniques.

Still referring to FIG. 3, electric aircraft 300 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 3, a number of aerodynamic forces may act upon the electric aircraft 300 during flight. Forces acting on electric aircraft 300 during flight may include, without limitation, thrust, the forward force produced by the rotating element of the electric aircraft 900 and acts parallel to the longitudinal axis. Another force acting upon electric aircraft 300 may be, without limitation, drag, which may be defined as a rearward retarding force which is caused by disruption of airflow by any protruding surface of the electric aircraft 300 such as, without limitation, the wing, rotor, and fuselage. Drag may oppose thrust and acts rearward parallel to the relative wind. A further force acting upon electric aircraft 300 may include, without limitation, weight, which may include a combined load of the electric aircraft 300 itself, crew, baggage, and/or fuel. Weight may pull electric aircraft 300 downward due to the force of gravity. An additional force acting on electric aircraft 300 may include, without limitation, lift, which may act to oppose the downward force of weight and may be produced by the dynamic effect of air acting on the airfoil and/or downward thrust from the propulsor 308 of the electric aircraft. Lift generated by the airfoil may depend on speed of airflow, density of air, total area of an airfoil and/or segment thereof, and/or an angle of attack between air and the airfoil. For example, and without limitation, electric aircraft 300 are designed to be as lightweight as possible. Reducing the weight of the aircraft and designing to reduce the number of components is essential to optimize the weight. To save energy, it may be useful to reduce weight of components of electric aircraft 300, including without limitation propulsors and/or propulsion assemblies. In an embodiment, motor 324 may eliminate need for many external structural features that otherwise might be needed to join one component to another component. Motor 324 may also increase energy efficiency by enabling a lower physical propulsor profile, reducing drag and/or wind resistance. This may also increase durability by lessening the extent to which drag and/or wind resistance add to forces acting on electric aircraft 300 and/or propulsors.

Figure 4:
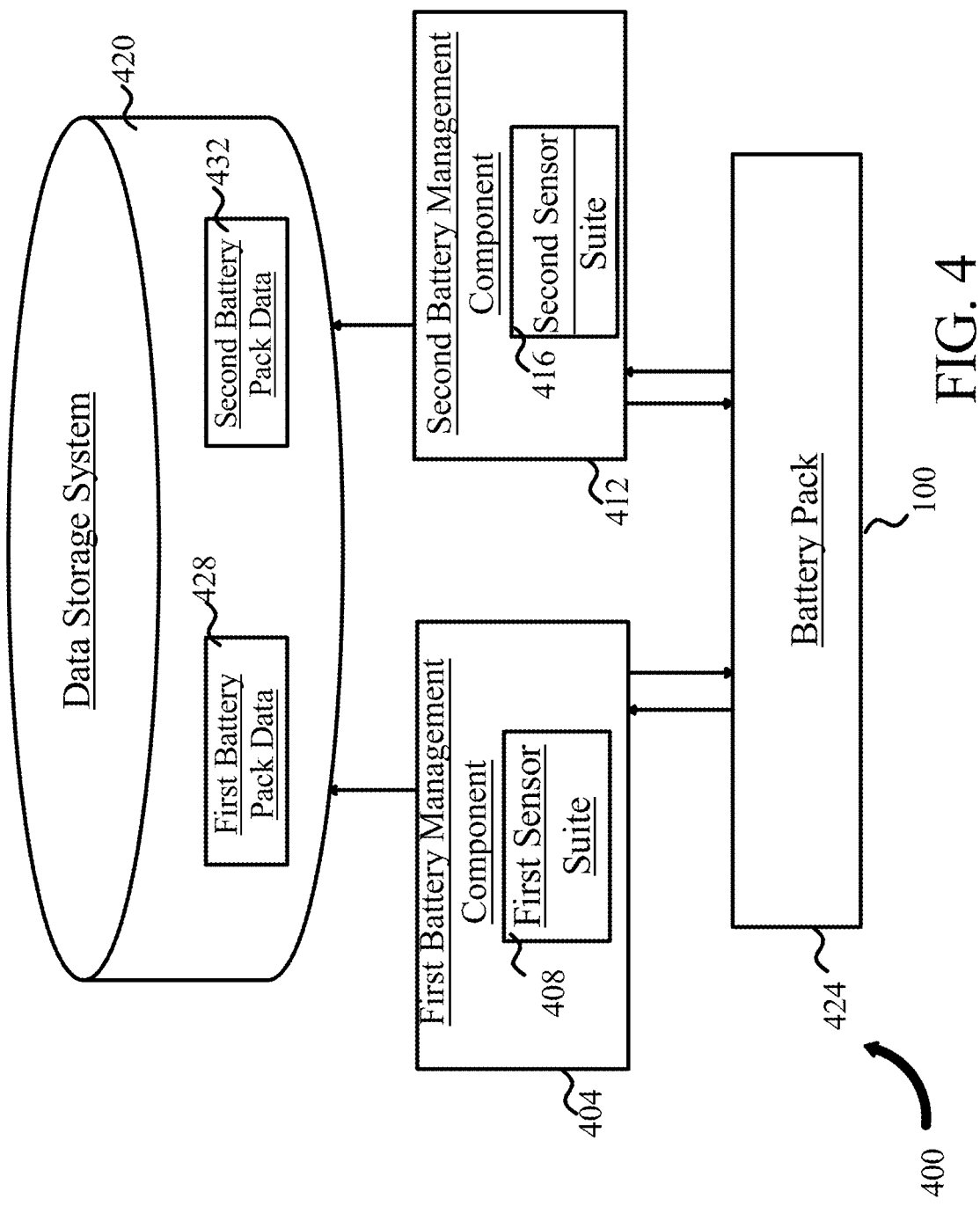
FIG. 4 is a block diagram of an exemplary battery management system.

Referring now to FIG. 4, an embodiment of battery management system 400 is presented. Battery management system 400 is be integrated in a battery pack configured for use in an electric aircraft. The battery management system 400 is be integrated in a portion of the battery pack or subassembly thereof. Battery management system 400 includes first battery management component 404 disposed on a first end of the battery pack. One of ordinary skill in the art will appreciate that there are various areas in and on a battery pack and/or subassemblies thereof that may include first battery management component 404. First battery management component 404 may take any suitable form. In a non-limiting embodiment, first battery management component 404 may include a circuit board, such as a printed circuit board and/or integrated circuit board, a subassembly mechanically coupled to at least a portion of the battery pack, standalone components communicatively coupled together, or another undisclosed arrangement of components; for instance, and without limitation, a number of components of first battery management component 404 may be soldered or otherwise electrically connected to a circuit board. First battery management component may be disposed directly over, adjacent to, facing, and/or near a battery module and specifically at least a portion of a battery cell. First battery management component 404 includes first sensor suite 408. First sensor suite 408 is configured to measure, detect, sense, and transmit first plurality of battery pack data 428 to data storage system 420.

Referring again to FIG. 4, battery management system 400 includes second battery management component 412. Second battery management component 412 is disposed in or on a second end of battery pack 424. Second battery management component 412 includes second sensor suite 416. Second sensor suite 416 may be consistent with the description of any sensor suite disclosed herein. Second sensor suite 416 is configured to measure second plurality of battery pack data 432. Second plurality of battery pack data 432 may be consistent with the description of any battery pack data disclosed herein. Second plurality of battery pack data 432 may additionally or alternatively include data not measured or recorded in another section of battery management system 400. Second plurality of battery pack data 432 may be communicated to additional or alternate systems to which it is communicatively coupled. Second sensor suite 416 includes a moisture sensor consistent with any moisture sensor disclosed herein, namely moisture sensor 504.

With continued reference to FIG. 4, first battery management component 404 disposed in or on battery pack 424 may be physically isolated from second battery management component 412 also disposed on or in battery pack 424. "Physical isolation", for the purposes of this disclosure, refer to a first system's components, communicative coupling, and any other constituent parts, whether software or hardware, are separated from a second system's components, communicative coupling, and any other constituent parts, whether software or hardware, respectively. First battery management component 404 and second battery management component 408 may perform the same or different functions in battery management system 400. In a non-limiting embodiment, the first and second battery management components perform the same, and therefore redundant functions. If, for example, first battery management component 404 malfunctions, in whole or in part, second battery management component 408 may still be operating properly and therefore battery management system 400 may still operate and function properly for electric aircraft in which it is installed. Additionally or alternatively, second battery management component 408 may power on while first battery management component 404 is malfunctioning. One of ordinary skill in the art would understand that the terms "first" and "second" do not refer to either "battery management components" as primary or secondary. In non-limiting embodiments, first battery management component 404 and second battery management component 408 may be powered on and operate through the same ground operations of an electric aircraft and through the same flight envelope of an electric aircraft. This does not preclude one battery management component, first battery management component 404, from taking over for second battery management component 408 if it were to malfunction. In non-limiting embodiments, the first and second battery management components, due to their physical isolation, may be configured to withstand malfunctions or failures in the other system and survive and operate. Provisions may be made to shield first battery management component 404 from second battery management component 408 other than physical location such as structures and circuit fuses. In non-limiting embodiments, first battery management component 404, second battery management component 408, or subcomponents thereof may be disposed on an internal component or set of components within battery pack 424, such as on battery module sense board 520.

Referring again to FIG. 4, first battery management component 404 may be electrically isolated from second battery management component 408. "Electrical isolation", for the purposes of this disclosure, refer to a first system's separation of components carrying electrical signals or electrical energy from a second system's components. First battery management component 404 may suffer an electrical catastrophe, rendering it inoperable, and due to electrical isolation, second battery management component 408 may still continue to operate and function normally, managing the battery pack of an electric aircraft. Shielding such as structural components, material selection, a combination thereof, or another undisclosed method of electrical isolation and insulation may be used, in non-limiting embodiments. For example, a rubber or other electrically insulating material component may be disposed between the electrical components of the first and second battery management components preventing electrical energy to be conducted through it, isolating the first and second battery management components from each other.

With continued reference to FIG. 4, battery management system 400 includes data storage system 420. Data storage system 420 is configured to store first plurality of battery pack data 428 and second plurality of battery pack data 432. Data storage system 420 may include a database. Data storage system 420 may include a solid-state memory or tape hard drive. Data storage system 420 may be communicatively coupled to first battery management component 404 and second battery management component 412 and may be configured to receive electrical signals related to physical or electrical phenomenon measured and store those electrical signals as first battery pack data 428 and second battery pack data 432, respectively. Alternatively, data storage system 420 may include more than one discrete data storage systems that are physically and electrically isolated from each other. In this non-limiting embodiment, each of first battery management component 404 and second battery management component 412 may store first battery pack data 428 and second battery pack data 432 separately. One of ordinary skill in the art would understand the virtually limitless arrangements of data stores with which battery management system 400 could employ to store the first and second plurality of battery pack data.

Referring again to FIG. 4, data storage system 420 stores first plurality of battery pack data 428 and second plurality of battery pack data 432. First plurality of battery pack data 428 and second plurality of battery pack data 432 may include total flight hours that battery pack 424 and/or electric aircraft have been operating. The first and second plurality of battery pack data may include total energy flowed through battery pack 424. Data storage system 420 may be communicatively coupled to sensors that detect, measure and store energy in a plurality of measurements which may include current, voltage, resistance, impedance, coulombs, watts, temperature, or a combination thereof. Additionally or alternatively, data storage system 120 may be communicatively coupled to a sensor suite consistent with this disclosure to measure physical and/or electrical characteristics. Data storage system 420 may be configured to store first battery pack data 428 and second battery pack data 432 wherein at least a portion of the data includes battery pack maintenance history. Battery pack maintenance history may include mechanical failures and technician resolutions thereof, electrical failures and technician resolutions thereof. Additionally, battery pack maintenance history may include component failures such that the overall system still functions. Data storage system 420 may store the first and second battery pack data that includes an upper voltage threshold and lower voltage threshold consistent with this disclosure. First battery pack data 428 and second battery pack data 432 may include a moisture level threshold. The moisture level threshold may include an absolute, relative, and/or specific moisture level threshold. Battery management system 400 may be designed to the Federal Aviation Administration (FAA)'s Design Assurance Level A (DAL-A), using redundant DAL-B subsystems.

Figure 5:
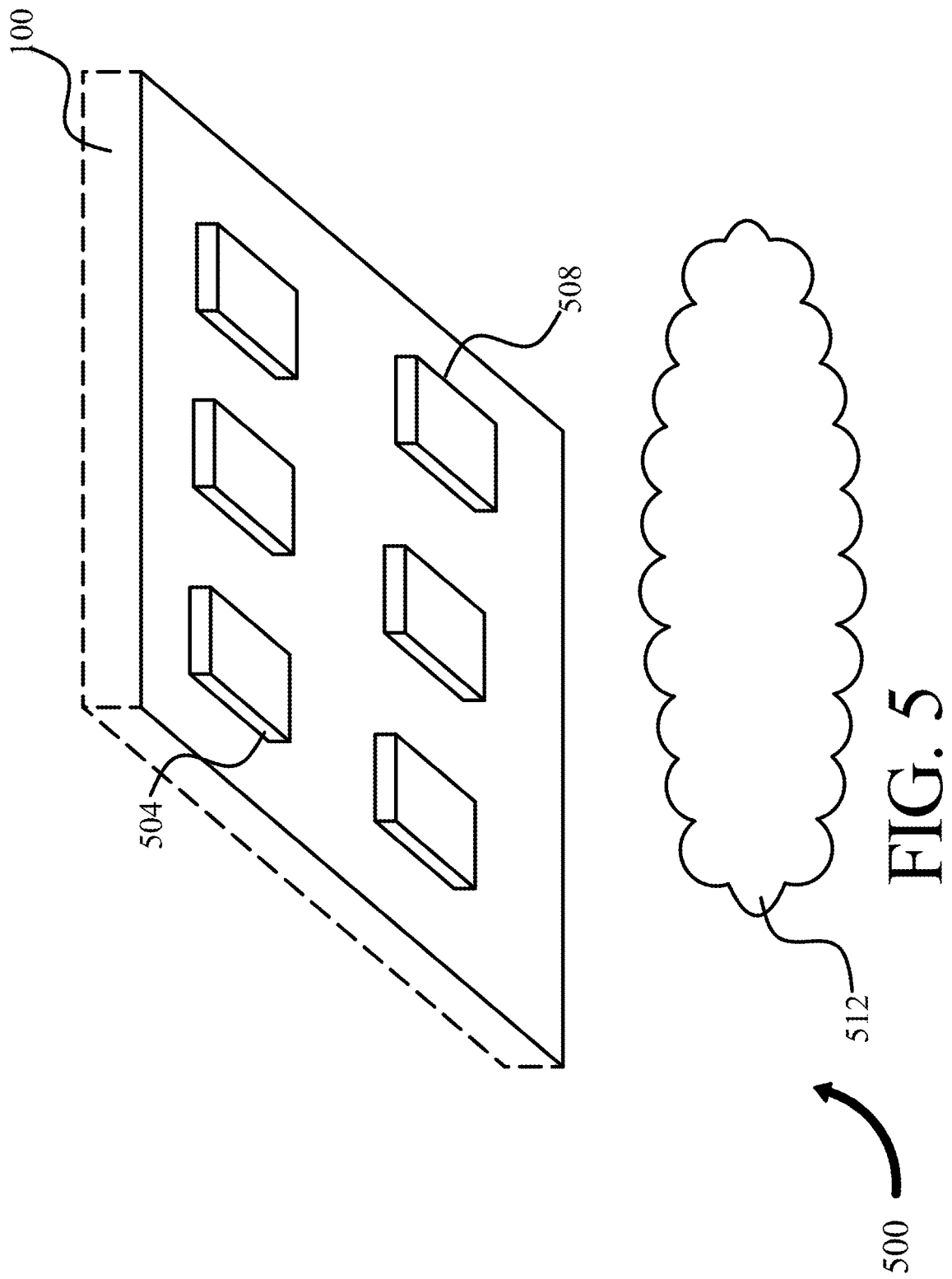
FIG. 5 is an illustration of a sensor suite in partial cross-sectional view.

Referring now to FIG. 5, an embodiment of sensor suite 500 is presented. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack 424 measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of battery management system 400 and/or user to detect phenomenon is maintained and in a non-limiting example, a user alter aircraft usage pursuant to sensor readings.

Sensor suite 500 may be suitable for use as first sensor suite 404 and/or second sensor suite 416 as disclosed with reference to FIG. 4 hereinabove. Sensor suite 500 includes a moisture sensor 504. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Moisture sensor 504 may be psychrometer. Moisture sensor 504 may be a hygrometer. Moisture sensor 504 may be configured to act as or include a humidistat. A "humidistat", for the purposes of this disclosure, is a humidity-triggered switch, often used to control another electronic device. Moisture sensor 504 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 5, sensor suite 500 may include electrical sensors 508. Electrical sensors 508 may be configured to measure voltage across a component, electrical current through a component, and resistance of a component. Electrical sensors 508 may include separate sensors to measure each of the previously disclosed electrical characteristics such as voltmeter, ammeter, and ohmmeter, respectively.

Alternatively or additionally, and with continued reference to FIG. 5, sensor suite 500 include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor suite 500 and/or a control circuit incorporated therein and/or communicatively connected thereto may be configured to adjust charge to one or more battery cells as a function of a charge level and/or a detected parameter. For instance, and without limitation, sensor suite 500 may be configured to determine that a charge level of a battery cell is high based on a detected voltage level of that battery cell or portion of the battery pack. Sensor suite 500 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 500 may include digital sensors, analog sensors, or a combination thereof. Sensor suite 500 may include digital-to-analog converters (DAC), analog-to-digital converters (ADC, A/D, A-to-D), a combination thereof, or other signal conditioning components used in transmission of a first plurality of battery pack data 428 to a destination over wireless or wired connection.

With continued reference to FIG. 5, sensor suite 500 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 500, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 5, sensor suite 500 may include a sensor configured to detect gas that may be emitted during or after a cell failure. "Cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of cell failure 512 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 500, may be configured to detect combustible, flammable, toxic, oxygen depleted, a combination thereof, or another type of gas alone or in combination. The gas sensor that may be present in sensor suite 500 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 500 may include sensors that are configured to detect non-gaseous byproducts of cell failure 512 including, in non-limiting examples, liquid chemical leaks including aqueous alkaline solution, ionomer, molten phosphoric acid, liquid electrolytes with redox shuttle and ionomer, and salt water, among others. Sensor suite 500 may include sensors that are configured to detect non-gaseous byproducts of cell failure 512 including, in non-limiting examples, electrical anomalies as detected by any of the previous disclosed sensors or components.

With continued reference to FIG. 5, sensor suite 500 may be configured to detect events where voltage nears an upper voltage threshold or lower voltage threshold. The upper voltage threshold may be stored in data storage system 420 for comparison with an instant measurement taken by any combination of sensors present within sensor suite 500. The upper voltage threshold may be calculated and calibrated based on factors relating to battery cell health, maintenance history, location within battery pack, designed application, and type, among others. Sensor suite 500 may measure voltage at an instant, over a period of time, or periodically. Sensor suite 500 may be configured to operate at any of these detection modes, switch between modes, or simultaneous measure in more than one mode. First battery management component 404 may detect through sensor suite 500 events where voltage nears the lower voltage threshold. The lower voltage threshold may indicate power loss to or from an individual battery cell or portion of the battery pack. First battery management component 404 may detect through sensor suite 500 events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation.

Figure 6:
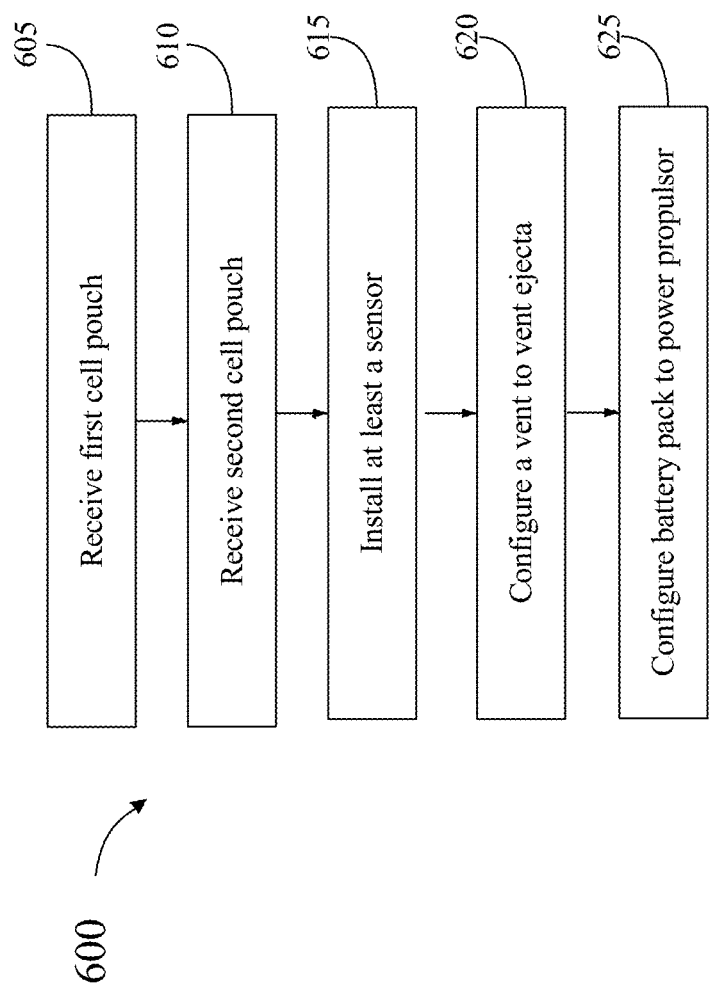
FIG. 6 is a flow diagram of an exemplary method of manufacture for a battery pack for preventing progression of thermal runaway between modules.

Referring now to FIG. 6, an exemplary method 600 of manufacture for a battery pack for preventing progression of thermal runaway between pouch cells is illustrated by way of flow diagram. At step 605, method may include receiving a first pouch cell. First pouch cell may include any pouch cell described in this disclosure, for example with reference to FIGS. 1-5. In some cases, first pouch cell may include at least a first pair of electrodes, at least a first pair of foil tabs welded to the first electrodes, at least a first insulator layer located substantially between the at least a first pair of foil tabs, a first pouch substantially encompassing the at least a first pair of foil tabs and the at least a first separator layer, and a first electrolyte within the first pouch.

Still referring to FIG. 6, at step 610 method may include receiving a second pouch cell. Second pouch cell may include any pouch cell described in this disclosure, including with reference to FIGS. 1-3. In some cases, second pouch cell may include at least a second pair of electrodes, at least a second pair of foil tabs welded to the second electrodes, at least a second insulator located substantially between the at least a second pair of foil tab, a second pouch substantially encompassing the at least a second pair of foil tabs and the at least a second separator layer, and a second electrolyte within the second pouch.

Still referring to FIG. 6, at step 615 method may include installing at least a sensor. Sensor may include any sensor described in this disclosure, including for example with reference to FIGS. 1-5. In some cases, at least a sensor may include a sensor suite. In some embodiments, step 615 may additionally configuring at least a sensor to detect and transmit battery pack data to a data storage system. Battery pack data may include any battery pack data described in this disclosure, for example with reference to FIGS. 1-5. Data storage system may include any data storage system described in this disclosure, for example with reference to FIGS. 1-5. In some embodiments, at least a sensor may be configured to detect cell failure. In some cases, at least a sensor may include a gas sensor. In some embodiments, at least a sensor may include a moisture sensor.

Still referring to FIG. 6, at step 620 method may include configuring a vent to vent ejecta from first pouch cell. Configuring a vent may include installing a vent in either or both of ejecta barrier and/or pouch cell. Vent may include any vent described in this disclosure, including for example with reference to FIGS. 1-5. In some embodiments, step 620 additionally includes configuring the vent to vent the ejecta from the first pouch cell along a flow path that does not include the second pouch cell. In some embodiments, vent may include a check valve. In some cases, check valve may include a duckbill check valve. In some embodiments, vent may include a mushroom poppet valve. In some embodiments, vent may include a seam of at least one of first pouch and ejecta barrier.

Still referring to FIG. 6, at step 625 method may include configuring battery pack to power at least a propulsor component. Battery pack may include any battery pack described in this disclosure, for example with reference to FIGS. 1-5. Propulsor component may include any propulsor component described in this disclosure, for example with reference to FIGS. 1-5. In some embodiments, propulsor component may include a motor drive. In some cases, motor drive may include an inverter.

With continued reference to FIG. 6, in some embodiments, method 600 additionally includes receiving and/or installing a third pouch cell. Third pouch cell may include any pouch cell described in this disclosure, for example with reference to FIGS. 1-5. In some cases, third pouch cell may include at least a third pair of electrodes, at least a third pair of foil tabs welded to the third electrodes, at least a third insulator layer located substantially between the at least a third pair of foil tabs, a third pouch substantially encompassing the at least a third pair of foil tabs and the at least a third separator layer, and a third electrolyte within the third pouch.

Exemplary parameters and ranges are provided as a non-limiting disclosure in table below.

|  | Minimum | Maximum | Nominal |
|---|---|---|---|
| Ejecta barrier thickness (mm) | 0.01 | 100 | 2 |
| Pouch thickness (mm) | 0.01 | 10 | 0.5 |
| Vent vacuum (inches Hg) | 0.1 | 36 | 10 |
| Energy capacity of pouch cell (W-hour) | 0.5 | 1000 | 60 |
| Insulator layer thickness (micrometers) | 0.1 | 1,000 | 20 |

-continued

|  | Minimum | Maximum | Nominal |
|---|---|---|---|
| Insulator layer porosity (%) | 0 | 100 | 35 |
| Anode materials | Graphite, Graphene, Carbon Nanotube, Yttria-stabilized Zirconia, Silicon, Composite | | |
| Cathode materials | Lithium-metal-oxide, Lithium Nickel Manganese Cobalt Oxide, Lithium Iron Phosphate, Composite | | |
| Ejecta barrier materials | Titanium, carbon fiber, silver, and gold | | |
| Electrolyte materials | Solvents conducting salt, | | |
| Insulator layer material | Polymer, microporous structure, polyolefine (PO) membranes, coated PO membranes, ceramic blended polyethylene (PE), nanofiber separators | | |
| Manufacturing bonding methods | Spot welding, ultrasonic welding, laser welding, brazing, soldering, adhering, engineering fits, connectors, fasteners, and the like. | | |

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
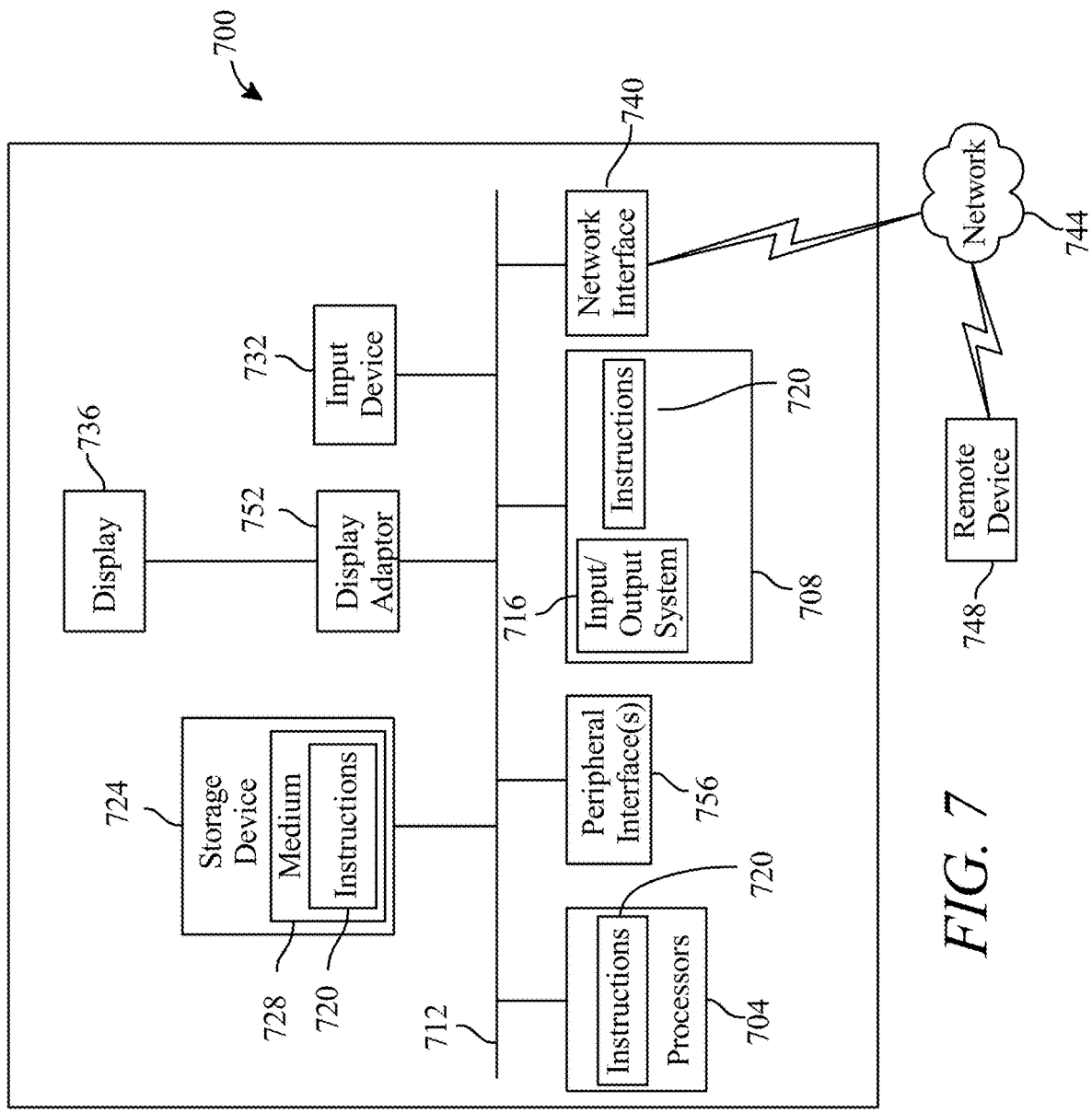
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A battery pack for an electric vertical take-off and landing aircraft comprising:
   a first pouch cell, wherein the first pouch cell comprises:
      at least an outer coating wherein the outer coating further comprises a metalized coating containing at least one of aluminum and nickel;
      at least a first pair of electrodes;
      at least a first pair of foil tabs electrically connected to the first electrodes;
      at least a first insulator layer located substantially between the at least a first pair of foil tabs;
      a first pouch substantially encompassing the at least a first pair of foil tabs and the at least a first insulator layer; and
      a first electrolyte within the first pouch;
   a second pouch cell disposed adjacent to the first pouch cell on a first side of the first pouch cell;
   at least a sensor configured to:
      sense battery pack data; and
      transmit the battery pack data to a data storage system; and
   a vent on a second side of the first pouch cell configured to vent the ejecta from the first pouch cell in a direction away from the second pouch cell, wherein the battery pack is configured to power at least a propulsor component.

2. The battery pack of claim 1, wherein the at least a sensor comprises a moisture sensor.

3. The battery pack of claim 1, further comprising:
   the second pouch cell, wherein the second pouch cell comprises:
      at least a second pair of electrodes;
      at least a second pair of foil tabs electrically connected to the second electrodes;
      at least a second insulator layer located substantially between the at least a second pair of foil tabs;
      a second pouch substantially encompassing the at least a second pair of foil tabs and the at least a second insulator layer; and
      a second electrolyte within the second pouch.

4. The battery pack of claim 2, wherein the vent is further configured to vent the ejecta from the first pouch cell along a flow path that does not intersect with a surface of the second pouch cell.

5. The battery pack of claim 1, wherein the vent comprises a check valve.

6. The battery pack of claim 5, wherein the check valve comprises a mushroom poppet valve.

7. The battery pack of claim 1, wherein the vent comprises a seam of the first pouch.

8. The battery pack of claim 1, wherein the at least a propulsor component comprises a motor drive.

9. The battery pack of claim 1, wherein the at least a sensor is configured to detect cell failure.

10. The battery pack of claim 9, wherein the at least a sensor comprises a gas sensor.

11. A method of manufacturing a battery pack for an electric vertical take-off and landing aircraft comprising:
    receiving a first pouch cell, wherein the first pouch cell comprises:
       at least an outer coating wherein the outer coating further comprises a metalized coating containing at least one of aluminum and nickel;
       at least a first pair of electrodes;
       at least a first pair of foil tabs electrically connected to the first electrodes;
       at least a first insulator layer located substantially between the at least a first pair of foil tabs;
       a first pouch substantially encompassing the at least a first pair of foil tabs and the at least a first insulator layer; and
       a first electrolyte within the first pouch;
    receiving a second pouch cell disposed adjacent to the first pouch cell on a first side of the first pouch cell;
    installing at least a sensor configured to:
       sense battery pack data; and
       transmit the battery pack data to a data storage system;
    configuring a vent on a second side of the first pouch cell configured to vent the ejecta from the first pouch cell in a direction away from the second pouch cell; and
    configuring the battery pack to power at least a propulsor component.

12. The method of claim 11, wherein the at least a sensor comprises a moisture sensor.

13. The method of claim 11, further comprising:
receiving the second pouch cell, wherein the second pouch cell comprises:
at least a second pair of electrodes;
at least a second pair of foil tabs electrically connected to the second electrodes;
at least a second insulator layer located substantially between the at least a second pair of foil tabs;
a second pouch substantially encompassing the at least a second pair of foil tabs and the at least a second insulator layer; and
a second electrolyte within the second pouch.

14. The method of claim 12, further comprising configuring the vent to vent the ejecta from the first pouch cell along a flow path that does not intersect with a surface of the second pouch cell.

15. The method of claim 11, wherein the vent comprises a check valve.

16. The method of claim 14, wherein the check valve comprises a mushroom poppet valve.

17. The method of claim 11, wherein the vent comprises a seam of the first pouch.

18. The method of claim 11, wherein the at least a propulsor component comprises a motor drive.

19. The battery pack of claim 11, wherein the at least a sensor is configured to detect cell failure.

20. The battery pack of claim 19, wherein the at least a sensor comprises a gas sensor.

\* \* \* \* \*